United States Patent [19]

Jones

[11] 4,366,019

[45] Dec. 28, 1982

[54] BELT APPLICATION ROLLER

[75] Inventor: Robert F. Jones, Westfield Center, Ohio

[73] Assignee: The B. F. Goodrich Company, Akron, Ohio

[21] Appl. No.: 183,597

[22] Filed: Sep. 2, 1980

[51] Int. Cl.³ ................... B29H 17/02; B29H 17/00
[52] U.S. Cl. ................... 156/360; 156/398; 156/408; 156/421; 156/405 R
[58] Field of Search .............. 156/405 R, 408, 421, 156/414–416, 398, 360

[56] References Cited

U.S. PATENT DOCUMENTS

| | | | |
|---|---|---|---|
| 3,441,074 | 4/1969 | Pouilloux et al. | 152/361 R |
| 3,546,042 | 12/1970 | Beer | 156/408 |
| 3,867,223 | 2/1975 | Appleby | 156/416 |
| 3,989,563 | 11/1976 | Schelkmann | 156/126 |
| 4,052,245 | 10/1977 | Kuts | 156/405 R |

FOREIGN PATENT DOCUMENTS 721237 2/1972 South Africa .

*Primary Examiner*—Edward C. Kimlin
*Assistant Examiner*—Lois E. Boland
*Attorney, Agent, or Firm*—Alfred D. Lobo; Michael J. Colitz, Jr.; Joe A. Powell

[57] ABSTRACT

To "set" the relative angular disposition of cords in plural inextensible belts on an inflated green tire carcass before it is cured in a mold, a roller is provided which momentarily presses a belt upon the carcass, thus "printing" the belt thereon at a fixed distance from the longitudinal axis of the carcass, and thereafter releases the belt. The carcass is inflated into a toroidal shape so that a point on the circumference of the carcass is at a predetermined inflated distance from the longitudinal axis of the carcass. The roller is placed on each belt to be "set" so that the roller contacts each belt prior to printing it on the carcass. The roller biases each belt on the carcass toward its (the carcass') longitudinal axis, and it is essential that the distance between the bottom surface of the roller and the longitudinal axis of the inflated carcass is maintained constant while each belt is in contact with the roller. The air cushion within the inflated carcass provides resistance against which the roller is biased. The tire is mounted only on bead flanges and there is no rigid support against which the roller acts. The tread is manually pressed on to the belts which have been printed on to the carcass with the roller, and spliced to encircle the belted carcass; thereafter, the tread, belts and sidewalls are together "stitched" to the carcass by conventional stitching rollers. Printing the belts with the roller, so that cords of one belt are at a predetermined oblique angle with respect to cords of another belt, sets this angle in the green tire in such a way that, upon curing of the green tire in a mold, a desired cured angle of the cords is obtained in a tire of excellent uniformity.

4 Claims, 4 Drawing Figures

BELT APPLICATION ROLLER

BACKGROUND OF THE INVENTION

This invention relates to an improved tire building machine and to a method of building a pneumatic tire. The machine is simple, rugged, and is capable of producing tires of excellent uniformity and quality with minimal attention of a skilled operator. The method is simple and fast.

In the building of tires having breaker plies (also referred to as "breakers" and hereafter referred to as "belts"), incorporated in the crown area of a tire, whether radial ply, bias ply, or other ply configuration, a two stage process is generally employed. During the first stage of building, a cylindrical carcass is formed having (a) one or more rubber covered cord plies wound around and interconnecting axially spaced, parallel, coaxial, bead cores, and (b) a layer of rubber sidewall stock on each sidewall of the carcass, intermediate the eventual crown area thereof and the two bead areas thereof. Such a carcass is referred to as a "first stage carcass". During the second stage of building, the shape of the first stage carcass is changed from a cylinder to a toroid and one or more rubber covered cord breaker plies and a rubber tread are added to the crown portion of the carcass to form what is referred to herein as a "green tire". The term "rubber" is used herein to describe a natural rubber, synthetic rubber and other rubbery material useful for the construction of tires. The term "cord" is used to describe single and multiple strands, filaments, wires or cables of natural and synthetic materials such as cotton, rayon, nylon, polyester, glass fiber, and the like, metal and/or such other materials as may be used as reinforcements in pneumatic tires.

In the cured, finished tire it is most important that its configuration be symmetrical about a vertical plane at right angle to the longitudinal axis of the tire. Also, the forces acting on the belts should be symmetrical and uniformly distributed while the tire is in use. Undesired displacement of the belts, and deviation of the cord angles are minimized by the herein disclosed method of building a tire, and the apparatus of this invention.

To obtain desired uniformity of a green tire, it is known to bond a plurality of belts to one and another on another molding drum to form a cylindrical composite belt in advance, and then, to bond the composite belt to the outer periphery of a green first stage carcass. An apparatus for forming such composite belts is disclosed in U.S. Pat. No. 3,441,074.

It is also well known to press or "print" a belt or tread on to a green carcass. However, when a belt was pressed on to the carcass, the carcass was either (a) supported above the beads with (i) an inflatable bladder support, or (ii) with a rigid support member; or, (b) there was no control of the printing location where the belt was applied radially relative to the longitudinal axis of the first stage carcass.

One of the most preferred prior art methods of applying belts to a first stage carcass is with a machine using movable shaping rings (referred to as "belt rings") which attempt to control both the outer circumference of the carcass, and, the distance from the longitudinal axis at which the belt is to be placed. The belt rings confine the carcass, providing a slight (about 0.0625") bulge of the median circumferential (crown) portion of the the carcass on which the belts are then positioned. Such a machine is disclosed in South African patent application No. 721,237, inter alia.

Where a tread was rolled on to a belted carcass, as for example when retreading a tire as disclosed in U.S. Pat. No. 3,989,563, no effort was made to provide a fixed radial distance of the point of adhesion of the tread relative to the longitudinal axis of the tire, and no thought was given to positioning the belts in this manner.

Undeniably effective as the belt ring machine is in the mass production of high quality tires, there are certain problems with respect to its utilization which have defied economically viable solutions. In particular, the complicated mechanism of the belt ring machine inevitably requires high maintenance with concomitantly high down-time and costs. Moreover, it is necessary to carry a high inventory of expensive machine components because they are prone to damage during use. Still other less desirable features of the belt ring machine is that it occupies a relatively large space on the floor of a tire plant, and, requires a level of due care for its operation not readily accorded the machine in day to day production. Most of all, there has been an as yet unfulfilled need for an uncomplicated machine which will match or better the performance of a belt ring machine, reliably and economically, with a minimum of highly skilled attention. The instant invention provides such a machine, and a simple method for its operation.

SUMMARY OF THE INVENTION

A simple and effective method has been discovered to operate a novel apparatus for pressing or "printing" one or more belts on a first stage carcass. It has been found that by fixing the "printing location" of a belt, relative to the longitudinal axis of a particular size of carcass, and thereafter encircling the belted carcass with a tread, "stitching" the assembly of belts and tread on the carcass, and curing the assembly in a conventional manner, a highly uniform tire may be obtained without the drawbacks of a conventional belt ring machine.

It is therefore a general object of this invention to provide an apparatus for "printing" at least one belt on to a first stage carcass in such a manner as to yield a highly uniform cured tire such as is particularly desired in a tire with radial ply construction.

It is also a general object of this invention to provide a method for building a tire economically and reliably without requiring the attention of a highly skilled operator.

It is a specific object of this invention to provide an apparatus for belting a first stage carcass, irrespective of its ply construction, utilizing a pair of axially displaceable bead flanges for mounting a carcass which, upon inflation to a preselected extent, has a belt "printed" on it by a roller (also referred to as a "print roller"), at a predetermined fixed printing location at which the carcass, with the belt in contact with it, is momentarily confined and then released to seek such shape as it may.

It is also a specific object of this invention to provide a simple and effective method for building a tire, in which method the operator mounts a first stage carcass on a pair of bead flanges which are then moved to permit the carcass to be lifted, either directly or indirectly, with air so as to present a compressible toroidal shape. He then places a first belt on the carcass and "prints" the belt on to it with a print roller which depresses and confines the belt in contact with the carcass at a location which is a narrow segment of its circumference, in such a way that the distance between the bottom surface of the print roller and the longitudinal axis of the carcass, is held essentially constant. Maintaining this location as the fixed printing location at which the first, and any successive belts are printed, unexpectedly "sets" a predetermined green angle of the cords of the belts. When the tire is then completed, by encircling it with a tread without attempting to maintain any specified distance between the bottom surface of the roller used to press the tread on the topmost belt, and, the longitudinal axis of the carcass, and the tire "stitched" and cured in a conventional manner, a finished tire is obtained which is at least as uniform as a typical tire built on a belt ring machine, if not more so.

BRIEF DESCRIPTION OF THE DRAWINGS

The foregoing and other objects and advantages of my invention will appear more fully from the following description, made in connection with the accompanying drawings, of a preferred embodiment of the invention, wherein like reference characters refer to the same or similar parts throughout the several views, and in which.

DETAILED DESCRIPTION OF A PREFERRED EMBODIMENT

Though this invention may be used to apply belts on any pneumatic tire, it will be described hereinbelow particularly for the application of belts on the carcass of a radial tire. Such a carcass is conventionally built on a first stage machine, for example, a Model 80 NRM first stage tire machine.

Figure 1:
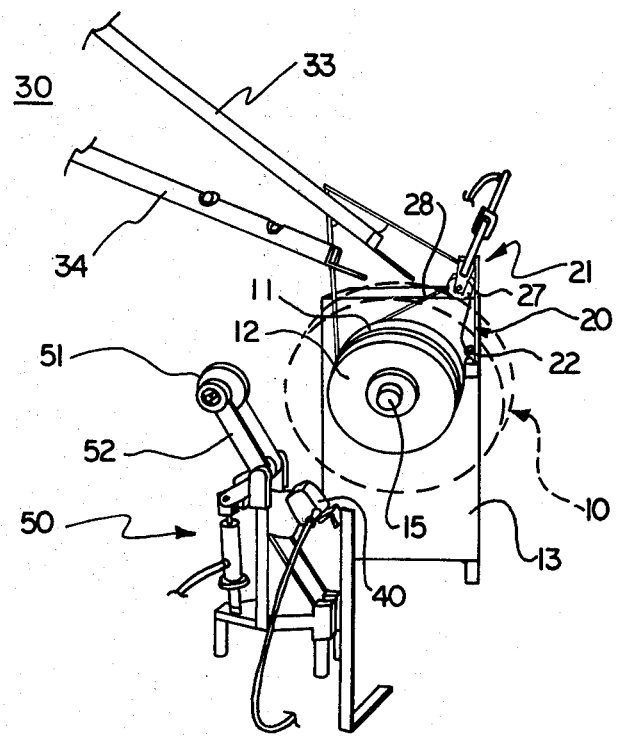
FIG. 1 is a perspective view from a slight elevation, showing the main components of the apparatus of this invention, and also showing portions of "servicer" and "stitcher" assemblies such as are conventionally used to build a green tire.

Referring now to FIG. 1, there is diagrammatically illustrated in perspective view a preferred embodiment of an assembly for the building of a radial ply tire, a carcass (shown in phantom outline) for which, indicated generally by reference numeral 10, is mounted on bead flanges 11 and 12. The bead flanges 11 and 12 which superficially resemble railroad wheels, are mounted in a supporting frame, indicated generally by reference numeral 13, for longitudinal axial movement relative to each other. Inner bead flange 11 is fixedly mounted in a vertical plane for rotation about its longitudinal axis, on a rotatable first, outer horizontal axial shaft journalled in frame 13. Outer bead flange 12 is fixedly mounted, parallel to inner bead flange 11, for rotation about the longitudinal horizontal axis, on a rotatable second, inner axial shaft 15 which is journalled and telescopable within outer shaft 14 so as to permit longitudinal axial movement of the bead flanges relative to each other. For convenience, the inner and outer bead flanges are removably mounted with machine screws to mounting hubs, to facilitate changing the bead flanges for a carcass of different dimensions.

Conventional means are provided in association with the frame 13 for rotating the outer and inner shafts 14 and 15 simultaneously at a slow speed in the range of from about 15 revolutions per minute (rpm) to about 20 rpm, which is sufficiently slow to enable an operator to position and "set" a belt on a carcass, as will be described in further detail hereinbelow. The shafts may also be rotated at a higher rotational speed in the approximate range of about 100 rpm which is found convenient to "stitch" the belts, tread and sidewalls on to the carcass, thus forming a green tire. By "stitch" I refer to the application of sufficient pressure to the tread and sidewalls over the outer curvature of the tire to remove air and to cause the tread, sidewall and belts to adhere tightly to the carcass, and to each other.

Similarly, conventional means are provided in association with the frame 13 for displacing the bead flanges longitudinally axially relative to each other, it being most convenient to move both flanges symmetrically with respect to a center line between the flanges. The displacement of the flanges to an open position for seating the beads of the carcass on the flanges, and, the subsequent displacement to a "form-in" tire-building (or closed) position for forming the tire into a toroidal shape, are each selected in relation to the dimensions of the first stage carcass to be mounted on the bead flanges.

An A-frame, indicated generally by reference numeral 20, supports a roller assembly, indicated generally by reference numeral 21, comprising a cylindrical roller 22 supported for rotation about its longitudinal horizontal axis in a yoke 23 in which axle 24 of the roller is rotatably journalled. Yoke 23 vertically depends from a piston rod 25 of any conventional positioning means 26 such as a fluid actuated device in which the piston rod 25 is reciprocable. A pneumatic cylinder or a hydraulic motor is preferred to provide reciprocable motion of the piston rod 25 to which roller 22 is adjustably affixed. Typically this is conveniently done by providing threads on the piston rod, and locking the yoke 23 at any desired position on the threaded rod by means of lock nuts.

The precise location of the roller radially along the circumference of the carcass 10 is not critical but it is preferred that the roller be transversely disposed in the upper vertical quadrant to facilitate placement of belts from a belt feed means, referred to as a "servicer" and indicated generally by reference numeral 30. It is most preferred to place roller 22 substantially vertically above the longitudinal axis of the carcass. Though the precise radially transverse location of the roller 22 on the carcass 10 is not critical, it is critical that the reciprocable motion of the positioning means place roller 22 at a predetermined fixed printing location at which each belt is to be printed, that is tightly pressed, on to the carcass at a radial distance from the longitudinal axis which distance is fixed for any given size of tire. Further, to position each belt on the carcass properly, the belt necessarily contacts the roller before it is printed on to the carcass. Contact of the belt with the carcass prior to contact with the roller might cause the belt to adhere to the carcass sufficiently to "set" the angle of the cords in the belt, and would thus defeat the purpose of the print roller.

The predetermined fixed printing location is that at which the carcass with at least one belt 31 thereon, is confined by contact with the roller 22. Such contact is made directly under the roller, the dimensions of which are chosen so that the segment of carcass in contact with the roller is defined by a radial angle of less than 5 degrees.

Figure 2:
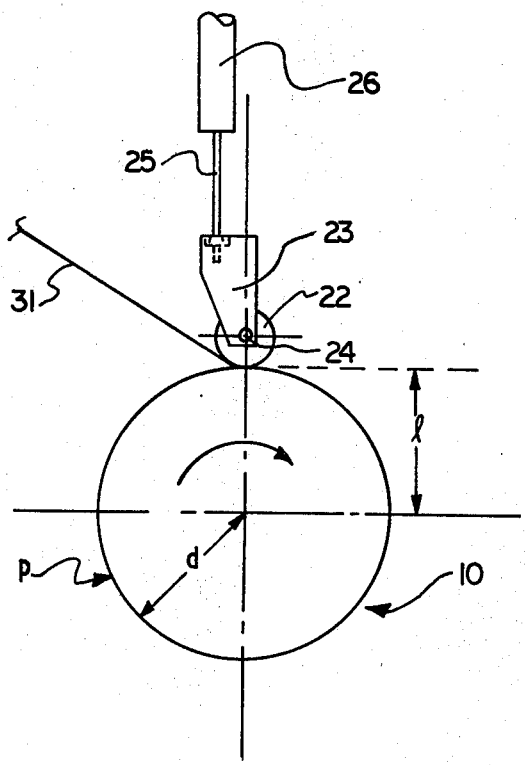
FIG. 2 is an end elevational view schematically illustrating a roller positioned on a carcass at a printing location at which a belt is printed on to the carcass while the roller is maintained at a fixed distance from the longitudinal axis of the carcass.

Referring to FIG. 2 there is schematically illustrated in side elevational view, an outline of the circumference of the first stage carcass 10 after it is inflated into a toroidal configuration in which point 'p' is located at a predetermined inflated distance 'd' from the longitudinal axis at the center of the carcass. The toroidal shape is imparted to the carcass by the simple expedient of moving outer bead flange 12 closer to inner bead flange 11 after forming an air cushion within the carcass by injecting enough air into the carcass to lift the carcass and to keep the beads air-tightly seated while the bead flanges are moving from the open position to a tire-building position. Thereafter, air pressure is maintained to keep the toroidal shape. Means to inflate the carcass are provided in any convenient manner, it being preferred to introduce air through an axial passage in the inner shaft 15. It will be evident that to enable the carcass to be inflated, the bead flanges should be designed to provide a seating surface for the beads of the carcass, thus providing an air-tight seal. Alternatively, an inflatable bladder may be provided within the carcass, such bladder being known in the art, but it will also be readily apparent, that it is more convenient to inflate the carcass directly.

The relative distance of the bead flanges in the tire-building position, which position allows the carcass to lift into the toroidal shape, is determined by choosing the position of a point 'p' on the circumference of the carcass relative to its longitudinal axis. Reverting to FIG. 1, point 'p' on the circumference of the toroidal carcass is positioned at a predetermined inflated distance from the longitudinal axis of the carcass by a sensing means which senses when point 'p' has reached its position as the bead flanges are brought closer to one and another. A preferred sensing means is a photoelectric eye assembly, indicated generally by reference numeral 40. As soon as the eye 40 senses the presence of point 'p' on the carcass, movement of the flanges towards one and another is stopped, and this is the tire-building position in which the belts are printed on to the carcass. The particular position of point 'p' is not critical, it being sufficient that the point be repeatedly consistently chosen on each succeeding carcass. It is preferred to choose point 'p' by positioning the visible seam of the first stage carcass at some predetermined position, say in the vertical plane directly above the longitudinal axis of the shafts, when the carcass is mounted on the bead flanges.

Roller 22 is positioned so that axle 24 is substantially vertically above, and remains generally parallel, to the longitudinal axis of the carcass. Some angulation of the axle in the horizontal plane occurs, and is desirable, to permit the roller to track in such a manner as to position belt 31 symmetrically about a central vertical plane through the carcass, and at right angle to the longitudinal axis. The diameter of the roller is not critical but a relatively small diameter steel roller is preferred because the larger its diameter, the larger is the arc over which contact of the belt with the carcass is made. A preferred size of the roller is in the range from about 2" to about 5" diameter, journalled on an axle so as to have minimal runout to ensure that the fixed printing location remains a constant distance from the longitudinal axis of the carcass. This fixed location is at the bottom surface of the roller, and the distance between the bottom surface and the longitudinal axis is fixed.

Since it is essential that each belt be positioned symmetrically about the vertical plane through the carcass, it is preferred to provide the roller 22 in the yoke 23 with a slight caster sufficient to permit the roller to position the belt symmetrically. To provide the desired caster, the yoke is so constructed as to have a horizontal displacement at right angle to the longitudinal axis, relative to the piston rod 25. If the rotation of the carcass is clockwise, as shown by the arrow in FIG. 2, then the displacement of the piston rod will be to the left of the vertical axis through the axle 24. In a practical application, to build a tire for a 15 inch diameter wheel, a roller 3" in diameter may be used with a caster of from about 0.375" to about 0.75".

Figure 3:
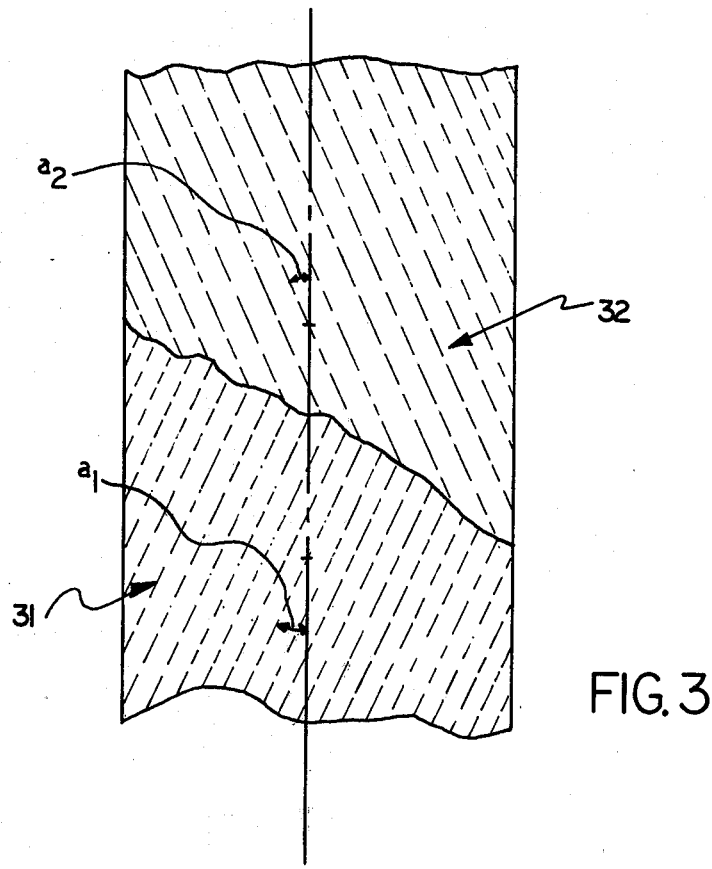
FIG. 3 is a fragmented plan view, partly in cross section, of two belts overlaid on a carcass with the cords of one belt at a predetermined oblique angle with respect to cords of the other belt.

Typically, at least two belts, namely a first belt 31 and a second belt 32 are dispensed from servicer 30, one at a time, from separate first and second conveyor dispensing means or "trays" 33 and 34 for the first and second belts respectively, and positioned, one overlaid on the other, on the carcass 10 as shown in the fragmented plan view, shown partly in cross-section, in FIG. 3 of the drawing. The belts are printed on the carcass, one at a time, at the predetermined fixed printing location, after the carcass has been formed, while inflated, into a toroidal shape. From the fixed printing location, the roller is reciprocable to a location away from the carcass. It will be evident that when belt 31 is positioned on the carcass, after a complete revolution thereof, the roller must be moved out of the way to enable the operator to splice both ends of the belt 31 to complete the circle. Thereafter a second belt 32 is dispensed from second tray 34 and positioned over the first belt, and again the roller 22 prints the belt 32 on the carcass at the same fixed distance '1' from the longitudinal axis, and the operator splices the ends of the second belt. Typically, each belt is fed from the servicer in such a way that the cords of the belts are at an oblique angle relative to each other, and at an acute angle to the central vertical plane through the carcass, which plane is at right angle to the longitudinal axis of the carcass.

Typically, the acute angle is the same for each belt, except the acute angle for each belt is measured from different directions relative to the vertical plane. Referring again to FIG. 3, belt 31 may be positioned on the green first stage carcass at an acute angle $a_1$ to the vertical (in FIG. 3), in the range from about 15° to about 30° measured clockwise from the vertical; belt 32 is then positioned so that its cords form an angle $a_2$ in the range from about 15° to about 30° measured counter-clockwise from the vertical, and usually the same as $a_1$. The oblique angle of the cords of each belt relative to each other is thus in the range from about 120° to about 150°, and the green carcass with belts 31 and 32 printed thereupon has the cords of the belts "set" so that they are symmetrically disposed in substantially mirror image relationship with each other relative to the central vertical plane.

To move the roller 22 out of the way before a splice is made, the A-frame 20 is mounted by the feet of its converging struts 27 and 28, on simultaneously reciprocable guide rods which are movable into and out of the support frame 13. A microswitch $S_1$ is provided on the A-frame and so positioned that the switch $S_1$ is tripped when the roller 22 is raised at the end of a complete "printing revolution" of the carcass, that is, after a belt is printed on, and encircles, the carcass. When switch $S_1$ is tripped, the guide rods 29 retract the A-frame so that roller 22 does not obstruct splicing of each belt by the operator.

Other microswitches $S_2$ and $S_3$ are provided on the first and second trays respectively so as to effect movement of the roller 22 into the fixed printing location as soon as the operator pulls a belt from a tray and places it on the carcass. Alternatively, the desired movement maybe obtained with manually actuated switches.

The bead flanges are displaced outwardly relative to each other into their "form-out" position, by means of a manual switch (not shown) to seat the beads of the carcass on the flanges; and, air is injected into the carcass as soon as its beads are seated on the bead flanges, in their open position to keep air pressure of about 6–10 psig.

The tread is manually positioned on the belted carcass, the tread being pre-cut for a particular size of tire. It is desirable to use the roller 22 to place the tread on the carcass.

If the green tire is to be built with the sidewalls over the tread, the sidewalls are folded down on the bead flanges, away from the carcass, until the belts are printed on, and the tread is manually placed on the topmost belt. The sidewalls are then folded up over the edges of the tread, and the tire "stitched" with a conventional stitching roller means, indicated generally by reference numeral 50, having a pair of rollers 51 one of each is at the end of each of a pair of swingable arms 52 which may be moved back and forth symmetrically across the periphery of the tire in a preselected manner. If the tire is to be built with the tread over the sidewalls in the shoulder area, the sidewalls are not folded down over the bead flanges when the carcass is mounted on them. The belts are printed on the carcass so that the edges of the belts overlap the edges of the sidewalls, and the tread is placed over the belts. The tire is then stitched.

Though the tire, whether constructed as a tread over sidewalls, or sidewalls over tread, may be stitched in the tire-building position of the bead flanges, it is preferred in each case to place the tread over the belts after first increasing the diameter of the toroidal carcass from that of its tire-building postion. It has been found that when this is done, the effect is to pull the edges of the belts down near the shoulders of the tire, thus minimizing the edge distortion of the cord angle in the shoulder area. This increase in diameter is effected by moving the bead flanges a little closer than their tire-building position. Because the diameter in the crown area of the tire is increased, the belts conform more closely to the curvature of the carcass in its shoulder area than they would at the tire-building position of the bead flanges. The most important effect is to minimize the change in angle of the cords of the belts in the shoulder area. Stitching is effected under increased air pressure in the range of from about 20 psi to about 30 psi. After the tire is stitched, the air used to inflate the carcass is vented from the carcass and the tire demounted, as explained in greater detail in the method of operation set forth hereinbelow.

Method of Operation:

The operator grasps a green first stage carcass, and, pulls it over the bead flanges which are in their most closely spaced position (also referred to as "the blow-off position") so that the beads of the carcass straddle the flanges. He then triggers a manual switch which moves the bead flanges out into a "form-out position" to seat the beads of the carcass on the bead flanges.

The subsequent closing in of the bead flanges into a "form-in position" may be actuated either with a manual switch, or, by a limit switch actuated by pulling the first tray down in preparation for placing the first belt on the carcass. Immediately, the carcass is inflated to lift it into a toroidal shape as the bead flanges move closer, and into their form-in position. This form-in position of the flanges is chosen so that a selected point on the circumference of the carcass reaches a preselected radial distance from the longitudinal axis at which distance a photocell-controlled relay stops movement of the flanges. A relay moves the print roller over the center of the carcass.

To position the first belt on the carcass, the end of the belt protruding from the first tray is pulled and centered on the carcass using either an edge-guide mounted on the tray, or, overhead slit lights to center the end of the belt, and the end is held in this position on the carcass. The operator then actuates a foot-switch which actuates a relay to bring the print-roller down on the end of the belt, depressing the belt and the carcass to a specific predetermined fixed printing location. This fixed printing location is set for each size of tire to be built by setting the downward displacement of the print roller. The same foot-switch then actuates a circuit which rotates the carcass through a single complete revolution, at a slow speed in the range from about 15 rpm to 20 rpm. While the carcass rotates, the belt first contacts the roller before the belt is printed on to the carcass, all the time being maintained at the fixed printing location.

After the revolution placing the first belt is completed, a spring retracts the print roller upward, and in doing so contacts a limit switch which causes the A-frame on which the print roller is mounted, to be withdrawn on its guide rods, away from the above the carcass. When so withdrawn, the print roller on its A-frame is in its home position adjacent the main support frame.

With the print roller out of the way, the operator cuts the first belt between the cords and applies the cut end of the belt on to the other end of the belt which was earlier printed on the carcass, so that the ends are joined.

When the first tray is manually pushed upwards and away from the carcass after the belt is cut, the second tray is pulled into position. The end of the second belt, protruding from the second tray, is pulled and placed on the first belt using the first belt as a guide, so that the belts are in congruent registry. Again, in a manner analogous to that used to print the first belt on to the carcass, the end of the second belt is held down, and printed on to the carcass, at the same fixed printing location as the first belt; the carcass is given a complete single revolution during which the second belt is printed on to the first belt, and then the second belt is cut and its ends joined, as before with the first belt, to form a circumferentially complete belt.

After the second belt is printed on the carcass, the second tray is pushed back into its home position away from the carcass. When this is done, (a) a control is actuated which moves a tread-tray into position; (b) actuates a control to move the print roller directly over the carcass; (c) switches the print roller into communication with a source of low pressure air which supplies regulated low pressure air which subsequently allows (in the later tread application step) application of light pressure on the tread as it is manually trained around and pressed in contact with the second belt; and, (d) actuates the position controller for the bead flanges to move the flanges into the tread application position so as to provide a larger diameter toroidal carcass which allows the belts to conform more closely to the contour of the tire, thus reducing cord angle distortion during stitching.

To apply the tread, the operator places one end on to the belted carcass, making certain the center line of the tread (marked on it) directly lines up with the vertical through the center of the carcass. This may be done with guide-lights, or, by lining the marked center line on the tread with a vertical line marked through the center of the print roller. As described before, the tire is then caused to make a complete single revolution at a slow speed while the print roller lightly presses the tread on to the carcas with no regard for the distance at which it is printed, relative to the longitudinal axis of the carcass. Upon completion of the revolution, a relay moves the print roller away from the carcass to its home position, and with the print roller out of the way, the operator splices the ends of the tread together making sure the splice fits precisely along its precut edges.

The tire is now ready to be stitched. This is done by the operator actuating a manual switch which (a) triggers a time delay to switch the air supply to a source of high pressure air thus allowing immediate inflation to about 18 psi to 20 psi; (b) causes the bead flanges (and the tire) to rotate at high speed in the range from 100 rpm to 150 rpm; (c) causes the stitcher rollers to press against the crown portion of the tire, and move from the central crown portion outward and over the shoulder of the tread; (d) thereafter causes the stitchers to retract to their home position. Additional switches and relay means stop rotation of the flanges, then move them into the blow-off position as the inflation pressure is released, which allows the beads of the green tire to be released from the beads of the flanges. The operator then simply removes the completed green tire from the flanges, and prepares to build another tire.

The foregoing procedure assumes the tread is to be positioned over the sidewall. If however, the sidewall is to be positioned over the tread, the foregoing operation is modified so that the stitchers clear the tire and move down over the sides near to the beads. The operator then turns up the sidewall (which was previously folded down) and actuates a switch which commences high speed rotation of the tire, and then causes the stitchers to press against the sidewalls and thereafter stitch the assembly towards the center of the tire, and back towards the shoulder. The remaining steps of stopping rotation, bringing the flanges to the blow-off position, and removing the completed tire are then the same as described for the tread over sidewall tire.

Comparison of Runout:

The average green carcass which has been built on a conventional first stage tire building machine has an unacceptably high runout of the circumference. Runout is measured with a laser beam which provides an accuracy of about ±0.001". The tire is mounted for rotation in a vertical plane, and the laser beam is aimed at its circumference at the bottom, in a direction parallel to the longitudinal axis of the tire. This runout is to be minimized before the belts are positioned on the carcass.

Figure 4:
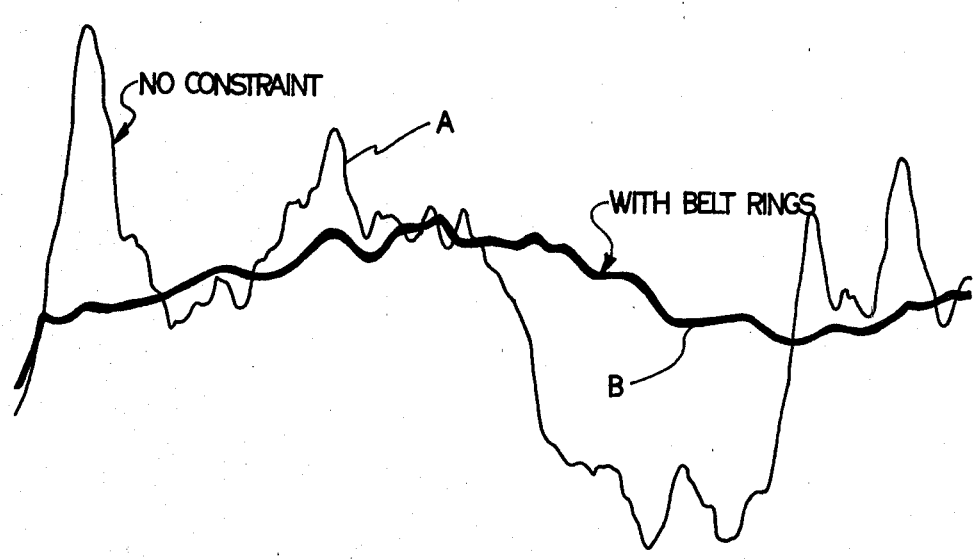
FIG. 4 are traces correlatable to the run-out of the circumference of a particular green first stage carcass, one of which traces (identified as 'A'), being for the carcass when it is unconstrained. The other trace (identified as 'B'), is for the same carcass when it is is constrained with belt rings such as are conventionally used to confine a carcass before one or more belts is pressed on to the carcass.

In FIG. 4 there is reproduced a typical "runout curve" for a green carcass which is mounted on bead flanges and inflated with about 6 psig (the curve is identified by the legend "no constraint" and the letter 'A'). The carcass is otherwise without constraint. The same carcass is then constrained by conventional belt rings, inflated to 6 psig, and its runout recorded as another curve (the curve is identified by the heavy line with the legend "with belt rings" and by the letter 'B'). A comparison of the curves indicates that the runout for the unconfined carcass varies from ±0.050" (the scale is not indicated in the Fig) above the "zero-runout line' to −0.050" below. Typically, the runout of a green carcass for a tire to be mounted on a 15 inch wheel, may be between about ±0.060" and −0.060", so that the overall runout will normally be about 0.120" or more. When confined with belt rings the runout is greatly decreased to within the range ±0.020 form the zero-runout line.

As demonstrated, the amount of improvement of uniformity attributable to the confining effect of the belt rings may readily be gauged by a comparison of curves A and B for any particular carcass. However, there is no known way of measuring the improvement in uniformity conferred on the carcass because of the action of the print roller used in the instant invention. Improvement of runout of the unbelted green carcass due to pressure from the print roller cannot be measured because the carcass is released immediately after it passes under the roller, and is then free to assume such shape as it may. As will be evident, the shape of the carcass just when the first belt is about to be printed on it, is not significantly different from its unconfined green shape, except where it is momentarily pressed upon by the print roller; and, the shape of the carcass after the first belt is printed on it, and the ends of the belt stitched so as to be circumferentially complete, may be significantly different from its unbelted shape because of the constraint of the first belt. The printing of the second belt on top of the first, with the print roller the same distance from the longitudinal axis of the tire as it was when the first belt was printed, enhances the uniformity of the belted carcass still further. A direct comparison of the improvement attributable to the print roller, with that attributable to the belt ring machine, once the tire is built, cannot conveniently be made.

The final test of uniformity is that obtained in the cured tire. The average improvement in uniformity obtained with the belt printer can only be compared with that obtained using a belt ring machine, or, no belt rings or constraint of any kind on the sidewalls of the carcass of the tire, if a statistical analysis of numerous cured tires tested in a uniformity machine, is made. The uniformity of the cord angle is measured, in one instance, by removing the tread from a cured tire and measuring the variations in angle of the topmost belt (second belt); thereafter, the topmost belt is removed from the carcass without disturbing the cords of the lower belt (first belt), and the cord angles of the lower belt are measured. Knowing that a cord angle of between 23°±2° (say) is desired in the cured tire, and knowing the average lift a green tire will be subjected to in the mold, one can compute that the green cord angle should be in the range from about 26° to about 28°, for the tire of a 15" wheel.

In the following comparison, two green radial ply carcasses (HR-78-15) for 15" wheels, each carcass having approximately the same overall runout, are each belted with two steel cord belts. The first carcass is belted with no sidewall constraint (referred to as "no constraint" and so identified in the following Table 1), each of the two belts being positioned with a green cord angle of 28°, except of course, each angle is measured from a different direction relative to the vertical. The green cord angle is calculated to give a cured cord angle of 23° in a particular mold designed to provide a preselected lift for the green tire. The second carcass is belted in a belt ring machine (identified as "with belt rings" in Table 1), again with a green cord angle of 28° for each steel cord belt. Both belted carcasses are finished with tread pieces cut from the same tread stock, each tread is conventionally "stitched" on to the belted carcasses, and the green tires are cured in curing presses at the same time in a conventional manner. The tread from each cured tire is then manually carefully cut away and the cured cord angles of the exposed topmost (second) belt are measured at twelve positions on the circumference of each tire. These cured cord angles at each of the different positions is listed hereinbelow in Table 1.

There appears to be a correlation between the amount of deviation of the cord angle and the low lateral, high lateral, low radial and high radial forces measured. The greater the deviation the greater is the variation of the forces measured. Therefore it is desired to maintain the cord angle constant. From a production viewpoint, it is desirable to maintain a deviation of less than ±2°, and still more desirable to maintain a deviation of less than ±1°. As will be evident from the cord angles read for the tire built with belt rings, the desired deviation is achieved. Measurements of the cord angles of belts built with the print roller and apparatus of this invention indicate that the cord angles are well within the limits of deviation specified in tires built with belt rings, and in most instances within ±1° of the desired cured angle. With such a small deviation, the variation in forces is well within generally specified tolerances. Tests on a uniformity machine indicate the tires built using the print roller are consistently of excellent quality.

The following Table 2 compares measurements of radial composite, lateral composite, radial harmonic, free radial runout, and conicity made on a uniformity machine, of several tires selected at random, some of which tires were built on a conventional belt ring machine (identified as "W/BR" in Table 2), the others being built without any constraint (identified as "No-Cons" in Table 2).

TABLE 2

| Radial Comp | | Lateral Comp | | Radial Harmon | | Free RadRn'out | | Conicity | |
| --- | --- | --- | --- | --- | --- | --- | --- | --- | --- |
| W/BR | NoCons | W/BR | NoCons | W/BR | NoCons | W/BR | NoCons | W/BR | NoCons |
| 30 | 23 | 16 | 14 | 8 | 18 | 40 | 52 | 11 | −2 |
| 32 | 23 | 10 | 12 | 8 | 10 | 25 | 37 | 3 | 1 |
| 24 | 28 | 4 | 8 | 13 | 21 | 38 | 43 | 4 | 4 |
| 24 | 18 | 10 | 12 | 10 | 15 | 31 | 46 | 4 | −6 |
| 21 | 28 | 4 | 22 | 8 | 17 | 28 | 62 | 0 | 1 |
| 19 | 20 | 10 | 10 | 6 | 6 | 24 | 32 | 4 | 4 |
| 29 | 25 | 8 | 14 | 18 | 12 | 49 | 37 | 1 | 7 |
| 37 | 17 | 12 | 12 | 22 | 12 | 52 | 27 | 0 | 6 |
| 25 | 26 | 16 | 20 | 8 | 22 | 40 | 45 | 3 | 6 |
| 22 | 29 | 8 | 6 | 6 | 19 | 35 | 38 | −2 | 4 |
| 26.3 | 23.7 | 9.8 | 13.0 | 10.7 | 15.2 | 36.2 | 41.9 | 2.8 | 2.5 Avg. |
| 5.6 | 4.3 | 4.2 | 4.9 | 5.4 | 5.1 | 9.5 | 10.1 | 3.6 | 4.1 S.D. |

TABLE 1

| Position on the Circumference | Cord Angle with No Constraint | Force | Cord Angle With Belt Rings |
| --- | --- | --- | --- |
| 1 | 21 | | 22 |
| 2 | 20 | Low lateral | 23 |
| 3 | 22 | | 23 |
| 4 | 25 | | 23 |
| 5 | 25 | | 22 |
| 6 | 24 | | 21 |
| 7 | 25 | | 22 |
| 8 | 26 | Low radial | 23 |
| 9 | 26 | High lateral | 22 |
| 10 | 25 | | 22 |
| 11 | 24 | | 23 |
| 12 | 22 | High radial | 23 |

From the computed average values ("Avg") it is evident that the tires built with belt rings are considerably better than those built without any constraint. It will also be evident that some of the tires built with no constraint have good values; this indicates that the tires were derived from green carcasses which were relatively more uniform than can be routinely expected. The values for standard deviation ("S.D.") computed above indicate that the deviations obtained are as might be expected.

The following Table 3 compares measurements of the same parameters measured in Table 2 hereinabove of several tires selected at random, some of which tires were built using the print roller of the instant invention (identified as "W/PR" in Table 3), the others being built without any constraint (identified as "NoCons" in Table 3).

TABLE 3

| Radial Comp | | Lateral Comp | | Radial Harmon | | Free RadRn'out | | Conicity | |
| --- | --- | --- | --- | --- | --- | --- | --- | --- | --- |
| W/PR | NoCons | W/PR | NoCons | W/PR | NoCons | W/PR | NoCons | W/PR | NoCons |
| 30 | 22 | 20 | 12 | 10 | 16 | 37 | 25 | 13 | 0 |
| 12 | 16 | 20 | 8 | 5 | 10 | 22 | 30 | −12 | −2 |
| 16 | 28 | 14 | 12 | 8 | 14 | 25 | 45 | 18 | −8 |
| 14 | 27 | 12 | 15 | 6 | 12 | 19 | 30 | 1 | −13 |
| 28 | 31 | 10 | 10 | 14 | 15 | 36 | 40 | 2 | −4 |
| 20 | 32 | 9 | 16 | 18 | 24 | 36 | 58 | −3 | 11 |
| 25 | 22 | 8 | 8 | 14 | 14 | 33 | 24 | −12 | −15 |

TABLE 3-continued

| Radial Comp | | Lateral Comp | | Radial Harmon | | Free RadRn'out | | Conicity | |
| --- | --- | --- | --- | --- | --- | --- | --- | --- | --- |
| W/PR | NoCons | W/PR | NoCons | W/PR | NoCons | W/PR | NoCons | W/PR | NoCons |
| 24 | 34 | 18 | 12 | 13 | 25 | 33 | 50 | −1 | 10 |
| 20.4 | 26.1 | 12.7 | 11.6 | 9.2 | 16.3 | 30.6 | 37.8 | −1.1 | −2.6 Avg. |
| 6.4 | 6.1 | 5.0 | 2.9 | 5.5 | 5.4 | 7.6 | 12.5 | 10.2 | 9.6 S.D. |

The following Table 4 compares measurements of the same parameters measured in Tables 2 and 3 hereinabove, of several tires selected at random, some of which tires were built using the print roller of the instant invention (identified as "W/PR" in Table 4), the others being built with belt rings (identified as "W/BR" in Table 4).

TABLE 4

| Radial Comp | | Lateral Comp | | Radial Harmon | | Free RadRn'out | | Conicity | |
| --- | --- | --- | --- | --- | --- | --- | --- | --- | --- |
| W/PR | W/BR | W/PR | W/BR | W/PR | W/BR | W/PR | W/BR | W/PR | W/BR |
| 30 | 30 | 20 | 16 | 10 | 8 | 37 | 40 | 13 | 11 |
| 12 | 32 | 20 | 10 | 5 | 8 | 22 | 25 | −12 | 3 |
| 16 | 24 | 14 | 4 | 8 | 13 | 25 | 38 | 18 | 4 |
| 14 | 24 | 12 | 10 | 6 | 10 | 19 | 31 | 1 | 4 |
| 28 | 21 | 10 | 4 | 14 | 8 | 36 | 28 | 2 | 0 |
| 20 | 19 | 9 | 10 | 18 | 6 | 36 | 24 | −3 | 4 |
| 25 | 29 | 8 | 8 | 14 | 18 | 33 | 49 | −12 | 1 |
| 24 | 37 | 18 | 12 | 13 | 22 | 39 | 52 | −1 | 0 |
| 13 | 25 | 8 | 16 | 3 | 8 | 26 | 40 | −11 | 3 |
| 22 | 22 | 8 | 8 | 14 | 6 | 39 | 35 | −6 | −2 |
| 20.4 | 26.3 | 12.7 | 9.8 | 9.2 | 10.7 | 30.6 | 36.2 | −1.1 | 2.8 |
| 6.4 | 5.6 | 5.0 | 4.2 | 5.5 | 5.4 | 7.0 | 9.5 | 10.2 | 3.6 |

I claim:
1. An apparatus for forming a green tire having plural circumferential belts on a carcass, and a tread overlaid on said belts, comprising:
   (a) a frame,
   (b) bead flanges mounted on said frame for longitudinal axial movement relative to each other, said bead flanges being adapted to support beads of said carcass when it is mounted on the flanges,
   (c) means for effecting said longitudinal axial relative movement,
   (d) means for rotating said bead flanges simultaneously,
   (e) means for inflating said carcasss with air so as to provide a compressible air cushion therewithin,
   (f) roller means radially transversely disposed relative to the longitudinal axis of said carcass so that a belt contacts said roller before said belt is printed on said carcass, said roller's longitudinal axis being located so as to provide a predetermined fixed printing location at which said carcass, with at least one belt thereon, is confined by contact with said roller over a segment of said carcass defined by a radial angle of less than 5 degrees, and
   (g) means to effect movement of said roller means to locate said roller means at said printing location, and intermittently to effect movement of said roller means away from said printing location.

2. The apparatus of claim 1 including means for displacing said bead flanges away from each other to an open bead flange spacing sufficient to seat the beads of the carcass on the bead flanges, and, for displacing said bead flanges towards each other from said open bead flange spacing to a tire-building bead flange spacing, so as to impart a toroidal shape to said carcass while maintaining said air cushion, and to position a point on the circumference of the toroidal carcass at a predetermined inflated distance from the longitudinal axis of said carcass.

3. The apparatus of claim 2 including sensing means to sense said point at said position, and, photoelectric relay means to stop displacement of said bead flanges towards each other when said point is sensed.

4. The apparatus of claim 3 wherein said bead flanges are adapted to air-tightly seat the beads of said carcass to allow it to be directly inflated.

* * * * *